A. M. LAYCOCK.
ROLLER BEARING.
APPLICATION FILED DEC. 18, 1915.

1,200,445.

Patented Oct. 3, 1916.

Witnesses
G. T. Baker
H. P. Jennings

Inventor
Arthur M. Laycock
by Foster, Freeman, Watson & Coit
Attorneys

UNITED STATES PATENT OFFICE.

ARTHUR M. LAYCOCK, OF KINGSTON, PENNSYLVANIA.

ROLLER-BEARING.

1,200,445.  Specification of Letters Patent.  Patented Oct. 3, 1916.

Application filed December 13, 1915. Serial No. 67,648.

*To all whom it may concern:*

Be it known that I, ARTHUR M. LAYCOCK, a subject of the King of Great Britain, and resident of Kingston, county of Luzerne, State of Pennsylvania, have invented certain new and useful Improvements in Roller-Bearings, of which the following is a specification.

This invention relates to roller bearings and has for its object the provision of a bearing of simple construction adapted for heavy service and which will be comparatively inexpensive to manufacture.

Figure 1:
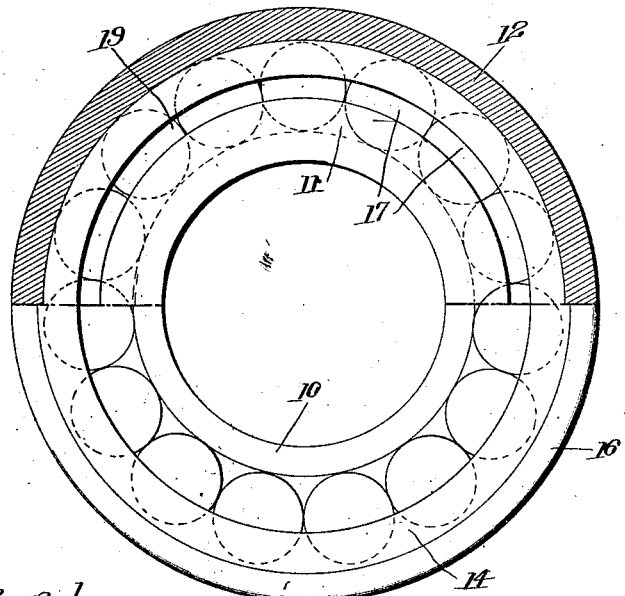
Figure 2:
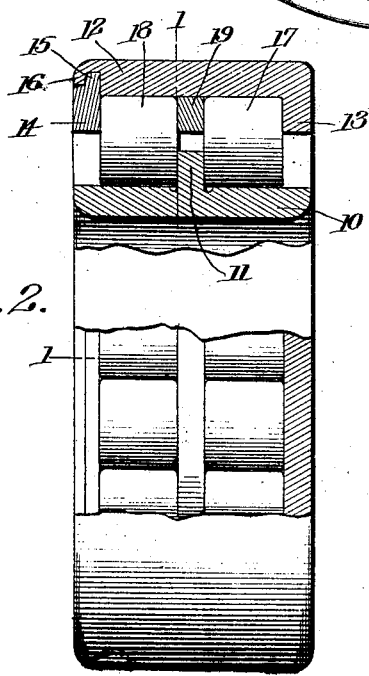
Figure 3:
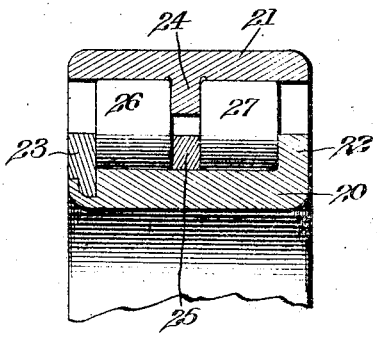

Other objects and the features of novelty will be apparent from the following description taken in connection with the accompanying drawings, in which, Figure 1 is a side elevation of a bearing embodying the invention, a portion of the figure being a section on the line 1—1 of Fig. 2; Fig. 2 is an edge view of the bearing shown in Fig. 1, with parts broken away and other parts shown in section; Fig. 3 is a transverse section of a modification of the invention.

Referring to the drawings, 10 indicates the inner ring of the bearing which is provided with a central radial spacing flange 11 on its exterior and which is, in the form shown in Figs. 1 and 2, preferably without side flanges. The outer ring 12 is preferably provided with side flanges one of which, indicated at 13, is formed integral with the ring and the other, indicated at 14 is preferably attached to the ring in any suitable manner and in Fig. 2 is shown as being attached by the coöperating flanges 15 and 16, the latter being turned over the former after the parts have been assembled. Spaces are provided on the opposite sides of the flange 11 for two series of rollers 17 and 18, the former series being arranged between the flanges 11 and 13 and the latter series being arranged between the flanges 11 and 14, the flanges coöperating to transmit end thrust from one ring to the other. In order to avoid any tendency for the rollers to tilt, due to end thrust thereon, a loose ring 19 may be provided in alinement with the flange 11 and in contact with the inner ends of the series of rollers 17 and 18.

In the form of the invention shown in Fig. 3, the design of the inner and outer rings 20 and 21 is substantially the opposite of that shown in Figs. 1 and 2. The inner ring 20 is provided with an integral flange 22, which is analogous to the flange 13 on the outer ring 12, and is also provided with an attached flange 23 which is analogous to the attached flange 14 of the ring 12. The outer ring 21 is provided with an internal central radial spacing flange 24 which is analogous to the flange 11, and is without side flanges. A loose ring 25 may be arranged between the series of rollers 26 and 27 and will be the equivalent of the ring 19. It will be observed that each roller has a diameter at least as great as its length and this arrangement has been found to secure very advantageous results. For instance, it has been found that where long rollers of comparatively small diameter have been used the rollers have a tendency to tip or turn so that the axis of the roller is not parallel with the axis of the bearing and the result is that the ends of the rollers are worn by frictional engagement with the end retaining flanges and have a tendency to bind. By the use of short rollers of comparatively large diameter this tendency is reduced to a minimum and it is possible to use a full bearing of such rollers without any spacing or retaining means. A plurality of rows of such short rollers with large diameters therefore furnish all of the advantages of the long rollers without their disadvantages.

It will be evident to those skilled in the art that changes in the minor details of construction may be made without departing from the spirit of the invention as defined in the appended claims.

Having described the invention what is claimed and desired to be secured by Letters Patent is, 1. In a roller bearing, the combination of an inner ring, an outer ring, a plurality of sets of rollers, one of said rings having an integral radial flange separating said sets of rollers and adapted to take the end thrust in either direction and the other of said rings having side radial flanges engaging the outer ends of said rollers, and a loose ring between said sets of rollers and adapted to transmit end thrust from one set to the other.

2. In a roller bearing, the combination of an inner ring provided with a central radial flange on its exterior forming spaces for two series of rollers, an outer ring having side flanges, rollers in said spaces having their ends in engagement with said flanges, and a loose ring in alinement with said central radial flange and adapted to transmit end thrust from one set of rollers to the other.

3. In a roller bearing the combination with an inner ring and an outer ring of two separated parallel sets of cylindrical rollers having square ends between said rings, flanges on one of said rings projecting partly over and bearing against the ends of said rollers, and a spacing flange on one of said rings between said rollers bearing against the ends of the rollers in each set.

4. In a roller bearing, the combination with an inner ring and an outer ring, a plurality of separated sets of cylindrical rollers between said rings, the diameter of each roller being as great as its length, flanges on one of said rings projecting partly over and bearing against the ends of said rollers, and a spacing flange on one of said rings between said rollers bearing aginst the ends of the rollers in each set.

5. In a roller bearing, the combination with an inner ring and an outer ring, of two separated sets of cylindrical rollers between said rings, the diameter of each roller being greater than its length, flanges on one of said rings projecting partly over and bearing against the ends of said rollers, and a spacing flange on one of said rings between said rollers bearing against the ends of the rollers in each set.

6. In a roller bearing, the combination with an inner ring and an outer ring, of a plurality of separated sets of cylindrical rollers between said rings, each set being independent of any other set, the diameter of each roller being substantially equal to its length, and means on the rings and coöperating with the ends of the rollers to take any end thrust.

In testimony whereof I affix my signature.

ARTHUR M. LAYCOCK.